United States Patent
Poduri et al.

(10) Patent No.: US 10,564,178 B2
(45) Date of Patent: Feb. 18, 2020

(54) SWING COMPENSATION IN STEP DETECTION

(71) Applicant: QUALCOMM Incorporated, San Diego, CA (US)

(72) Inventors: Sameera Poduri, Sunnyvale, CA (US); Disha Ahuja, San Jose, CA (US); Victor Kulik, San Jose, CA (US); Payam Pakzad, Mountain View, CA (US); Ravi Palanki, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1271 days.

(21) Appl. No.: 14/044,775

(22) Filed: Oct. 2, 2013

(65) Prior Publication Data

US 2014/0180621 A1 Jun. 26, 2014

Related U.S. Application Data

(60) Provisional application No. 61/745,535, filed on Dec. 21, 2012.

(51) Int. Cl.
*G01P 21/00* (2006.01)
*G01C 22/00* (2006.01)

(52) U.S. Cl.
CPC ............ *G01P 21/00* (2013.01); *G01C 22/006* (2013.01)

(58) Field of Classification Search
CPC ................................ G01C 22/006; G01P 21/00
See application file for complete search history.

(56) References Cited

U.S. PATENT DOCUMENTS

| 7,983,872 B2 | 7/2011 | Makino et al. |
| 2005/0034539 A1* | 2/2005 | Tan ...................... G11B 5/5526 73/862.08 |
| 2008/0266085 A1* | 10/2008 | Kagermeier .......... G08C 17/02 340/540 |
| 2008/0275348 A1 | 11/2008 | Catt et al. |
| 2009/0144020 A1 | 6/2009 | Ohta et al. |

(Continued)

FOREIGN PATENT DOCUMENTS

| CN | 201315609 Y | 9/2009 |
| CN | 102313555 A | 1/2012 |

(Continued)

OTHER PUBLICATIONS

International Search Report and Written Opinion—PCT/US2013/071068—ISA/EPO—dated Feb. 18, 2014.

(Continued)

*Primary Examiner* — Mischita L Henson
(74) *Attorney, Agent, or Firm* — Kilpatrick Townsend & Stockton, LLP

(57) ABSTRACT

Step detection accuracy in mobile devices is increased by determining whether swinging is taking place. According to the invention, swinging can be detected using threshold detection, Eigen analysis, hybrid frequency analysis, and/or gyroscope-based analysis, for example. The determination that swinging is (or may be) occurring can impact how the mobile device reports detected steps for step detection. A count of missteps and/or a level of certainty, based on swing detection, can be provided with a step count.

38 Claims, 17 Drawing Sheets

(56) References Cited

U.S. PATENT DOCUMENTS

| | | | |
|---|---|---|---|
| 2010/0188284 A1* | 7/2010 | Anand | G01S 19/47 |
| | | | 342/357.25 |
| 2011/0066320 A1* | 3/2011 | Bechtler | B60T 8/885 |
| | | | 701/29.2 |
| 2011/0282620 A1 | 11/2011 | Sakuraoka | |
| 2012/0006112 A1 | 1/2012 | Lee et al. | |
| 2012/0220881 A1 | 8/2012 | Takahashi | |
| 2012/0296603 A1 | 11/2012 | Kulik et al. | |
| 2013/0046505 A1 | 2/2013 | Brunner et al. | |
| 2013/0085711 A1 | 4/2013 | Modi et al. | |
| 2013/0090881 A1 | 4/2013 | Janardhanan et al. | |
| 2013/0095861 A1* | 4/2013 | Li | G01S 5/0263 |
| | | | 455/456.6 |
| 2014/0365169 A1* | 12/2014 | Pham | G01C 22/006 |
| | | | 702/160 |

FOREIGN PATENT DOCUMENTS

| | | | |
|---|---|---|---|
| CN | 102419180 A | | 4/2012 |
| EP | 2386827 A2 | | 11/2011 |
| EP | 2402715 A2 | | 1/2012 |
| JP | 08014917 A | * | 1/1996 |
| JP | 2008191992 A | | 8/2008 |
| JP | 2010026722 A | | 2/2010 |
| JP | 2010167275 A | | 8/2010 |
| JP | 2011257374 A | | 12/2011 |
| JP | 2012001925 A | | 1/2012 |
| WO | 2006008790 A1 | | 1/2006 |
| WO | 2009122788 A1 | | 10/2009 |

OTHER PUBLICATIONS

Mantyjarvi Jani., et al., "Recognizing Human Motion With Multiple Acceleration Sensors", IEEE International Conference on Systems, Man and Cybernetics. E-Systems and E-Man for Cybernetics in Cyberspace, P, vol. 2, Oct. 7, 2001, pp. 747-752.

Moe-Nilssen Rolf, et al., "Estimation of gait cycle characteristics by trunk accelerometry", Journal of Biomechanics vol. 37, No. 1, Jan. 1, 2004, pp. 121-126.

\* cited by examiner

SWING COMPENSATION IN STEP DETECTION

CROSS-REFERENCE TO RELATED APPLICATIONS

This application claims the benefit of Provisional U.S. Application Ser. No. 61/745,535, filed Dec. 21, 2012, entitled "STEP DETECTION AND/OR PEDOMETER OPERATION," which is incorporated herein by reference.

BACKGROUND

Pedometers and step detectors based on inertial sensors have found various applications in fitness, health monitoring, positioning systems, and more. Step detection in these applications is typically based on sensors that are constrained to a particular position with respect to a pedestrian (e.g., waist, wrist, shoes, etc.). For mobile phones and other mobile devices, step detection can be more difficult because the mobile device can be carried in any of a variety of locations (e.g., a pedestrian's hand, pocket, purse, etc.) and subject to combined motion. Step detection performed when the mobile device is in the hand of a user's swinging arm can be particularly difficult. As such, step detection in mobile devices performed when such swinging is occurring can be highly inaccurate.

SUMMARY

Embodiments of the invention are directed toward increasing step detection accuracy in mobile devices by determining whether such swinging is taking place. According to the invention, swinging can be detected using threshold detection, Eigen analysis, hybrid frequency analysis, and/or gyroscope-based analysis, for example, as detailed herein. The determination that swinging is (or may be) occurring can impact how the mobile device reports detected steps for step detection. A count of missteps and/or a level of certainty, based on swing detection, can be provided with a step count.

An example method of swing compensation in step detection, according to the disclosure, includes obtaining acceleration data indicative of movement of a mobile device, determining whether the mobile device may be swinging in a hand of a user of the mobile device, and outputting step data based on the acceleration data and the determination whether the mobile device may be swinging in the hand of the user.

The example method of swing compensation in step detection can include one or more of the following features. Determining whether the mobile device may be swinging in the hand of the user can include determining whether the acceleration data exceeds a threshold value. The threshold value can be between 10 and 12 m/s2. Determining whether the mobile device may be swinging in the hand of the user can include calculating eigenvalues of the acceleration data. The method can also include determining whether at least one eigenvalue exceeds a threshold value and/or determining whether a ratio of the eigenvalues exceeds a threshold value Determining whether the mobile device may be swinging in the hand of the user can include conducting a frequency analysis of the acceleration data. The frequency analysis can include autocorrelation and/or combining the acceleration data with a nominal step rate. The frequency analysis can include determining a frequency from the acceleration data and determining that twice the determined frequency falls within a predetermined range of known step rates. The method may further include determining a probability related to the determination of whether the user made a step.

Additionally or alternatively, the example method of swing compensation in step detection can include one or more of the following features. Determining whether the mobile device may be swinging in the hand of the user can include estimating a direction of gravity, determining an angle of the mobile device in relation to the direction of gravity, and determining whether the angle exceeds a threshold value. Determining whether the mobile device may be swinging in the hand can be based, at least in part, on data from a gyroscope. Outputting step data can include outputting a number of detected steps. The number of detected steps can be altered from an original number, based on the determination whether the mobile device may be swinging in the hand of the user. Outputting step data can further include outputting a number of undetected steps and/or a probability associated with the number of detected steps.

An example apparatus, according to the disclosure, can include a memory and a processing unit coupled to the memory, where the processing unit is configured to perform functions including obtaining acceleration data indicative of movement of a mobile device, determining whether the mobile device may be swinging in a hand of a user of the mobile device, and outputting step data based on the acceleration data and the determination whether the mobile device may be swinging in the hand of the user.

The example apparatus can include one or more of the following features. The apparatus can include an accelerometer that is communicatively coupled with the processing unit and configured to provide the acceleration data. The processing unit can be further configured to determine a probability related to the determination of whether the user made a step. The processing unit can be configured to determine whether the mobile device may be swinging in the hand of the user by estimating a direction of gravity, determining an angle of the mobile device in relation to the direction of gravity, and determining whether the angle exceeds a threshold value. The processing unit can be configured to determine whether the mobile device may be swinging in the hand is based, at least in part, on data from a gyroscope. The processing unit can be configured to output step data by outputting a number of detected steps. The processing unit can be configured to alter the number of detected steps from an original number, based on the determination whether the mobile device may be swinging in the hand of the user. The processing unit can be further configured to output a number of undetected steps and/or output a probability associated with the number of detected steps.

An example device, according to the disclosure, includes means for obtaining acceleration data indicative of movement of a mobile device, means for determining whether the mobile device may be swinging in a hand of a user of the mobile device, and means for outputting step data based on the acceleration data and the determination whether the mobile device may be swinging in the hand of the user.

The example device can include one or more of the following features. The means for determining whether the mobile device may be swinging in the hand of the user can include means for calculating eigenvalues of the acceleration data. The device may further include means for determining whether at least one eigenvalue exceeds a threshold value and/or means for determining whether a ratio of the eigenvalues exceeds a threshold value. The device may further include means for determining whether the mobile device may be swinging in the hand of the user comprise means for conducting a frequency analysis of the acceleration data. The frequency analysis can include autocorrelation. The means for conducting the frequency analysis can include means for combining the acceleration data with a nominal step rate. The means for conducting the frequency analysis can include means for determining a frequency from the acceleration data, and means for determining that twice the determined frequency falls within a predetermined range of known step rates.

An example computer-readable storage medium, according to the disclosure, can have instructions embedded thereon for causing one or more computing devices to perform swing compensation in step detection. The instructions can include computer code for obtaining acceleration data indicative of movement of a mobile device, determining whether the mobile device may be swinging in a hand of a user of the mobile device, and outputting step data based on the acceleration data and the determination whether the mobile device may be swinging in the hand of the user.

An example computer-readable storage medium can further include one or more of the following features. The code for determining whether the mobile device may be swinging in the hand of the user can include code for determining whether the acceleration data exceeds a threshold value. The code for determining whether the mobile device may be swinging in the hand of the user can include code for calculating eigenvalues of the acceleration data. The code for determining whether the mobile device may be swinging in the hand of the user can include code for conducting a frequency analysis of the acceleration data. The code for determining whether the mobile device may be swinging in the hand of the user includes code for estimating a direction of gravity, determining an angle of the mobile device in relation to the direction of gravity, and determining whether the angle exceeds a threshold value. The code for outputting step data includes code for outputting a number of detected steps.

Items and/or techniques described herein may provide one or more of the following capabilities, as well as other capabilities not mentioned. Techniques can provide for increased accuracy in step detection for mobile devices. This can, in turn, improve the accuracy of applications utilizing a pedometer, such as fitness and health monitoring, dead reckoning for positioning applications, and the like, ultimately providing a better user experience. These and other advantages and features are described in more detail in conjunction with the text below and attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
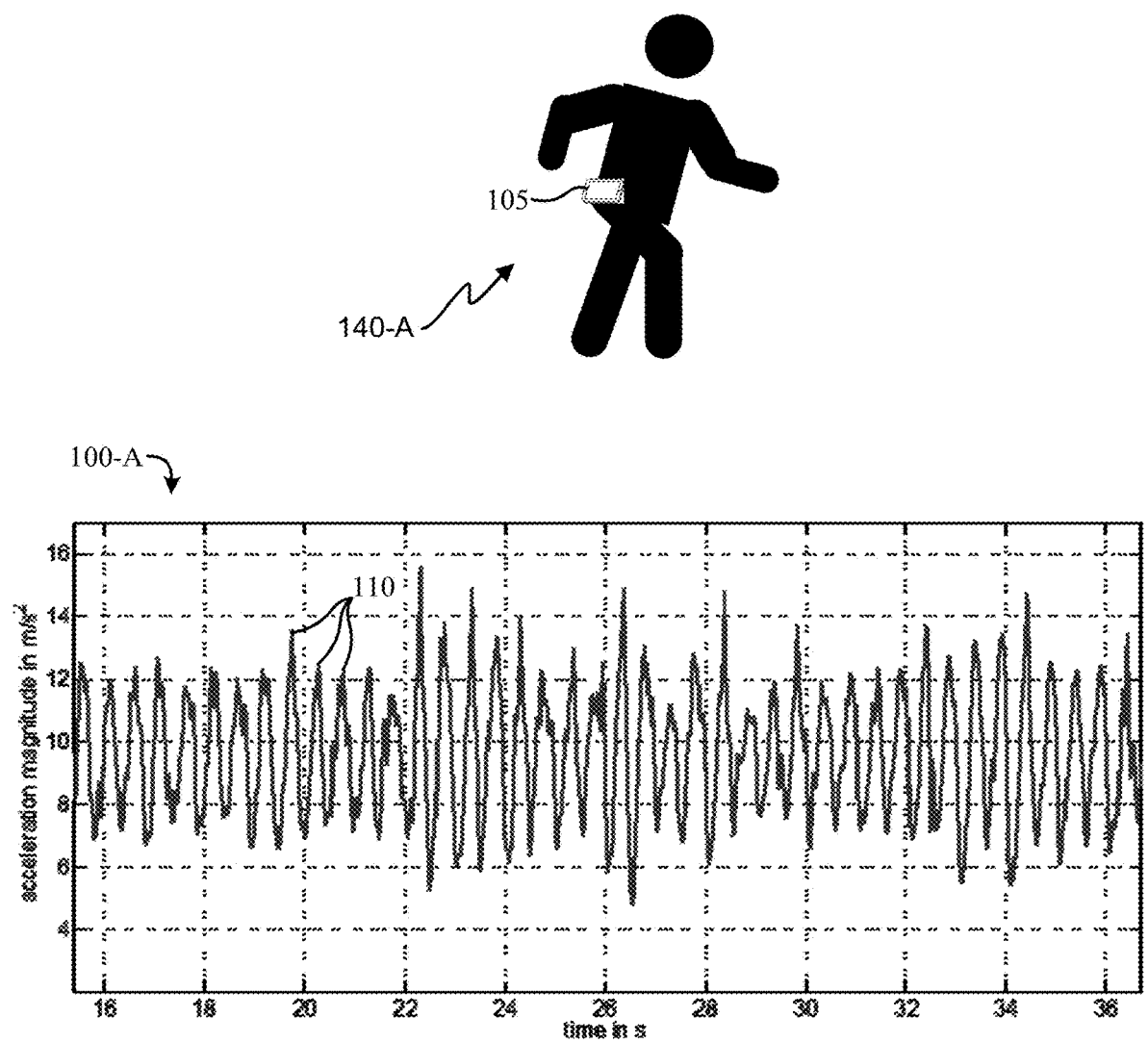
FIGS. 1A-1C are drawings of acceleration plots illustrating measured vertical acceleration over time and figures indicating corresponding positions of a mobile device relative to a user.

The following description is provided with reference to the drawings, where like reference numerals are used to refer to like elements throughout. While various details of one or more techniques are described herein, other techniques are also possible. In some instances, structures and devices are shown in block diagram form in order to facilitate describing various techniques.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

Inertial sensor-based step detectors are utilized in a variety of applications that can utilize information when a user of a mobile device takes a step, such as fitness and health monitoring, dead reckoning for fire-fighters, and more. In most applications, the sensors are placed in a constrained position with respect to the user. For example sensors are attached to the waist, wrist, shoes, etc., of a user. Because of the prevalence of inertial sensors in mobile devices such as mobile phones, portable media players, gaming devices, and other portable electronics, these mobile devices can also be used to estimate the number of steps taken by a user.

However, because the mobile devices is not held in a constrained position, and as a result, the inertial sensors can measure the combined motion due to steps and other activities, including holding the mobile devices in a swinging hand while walking.

Figure 1B:
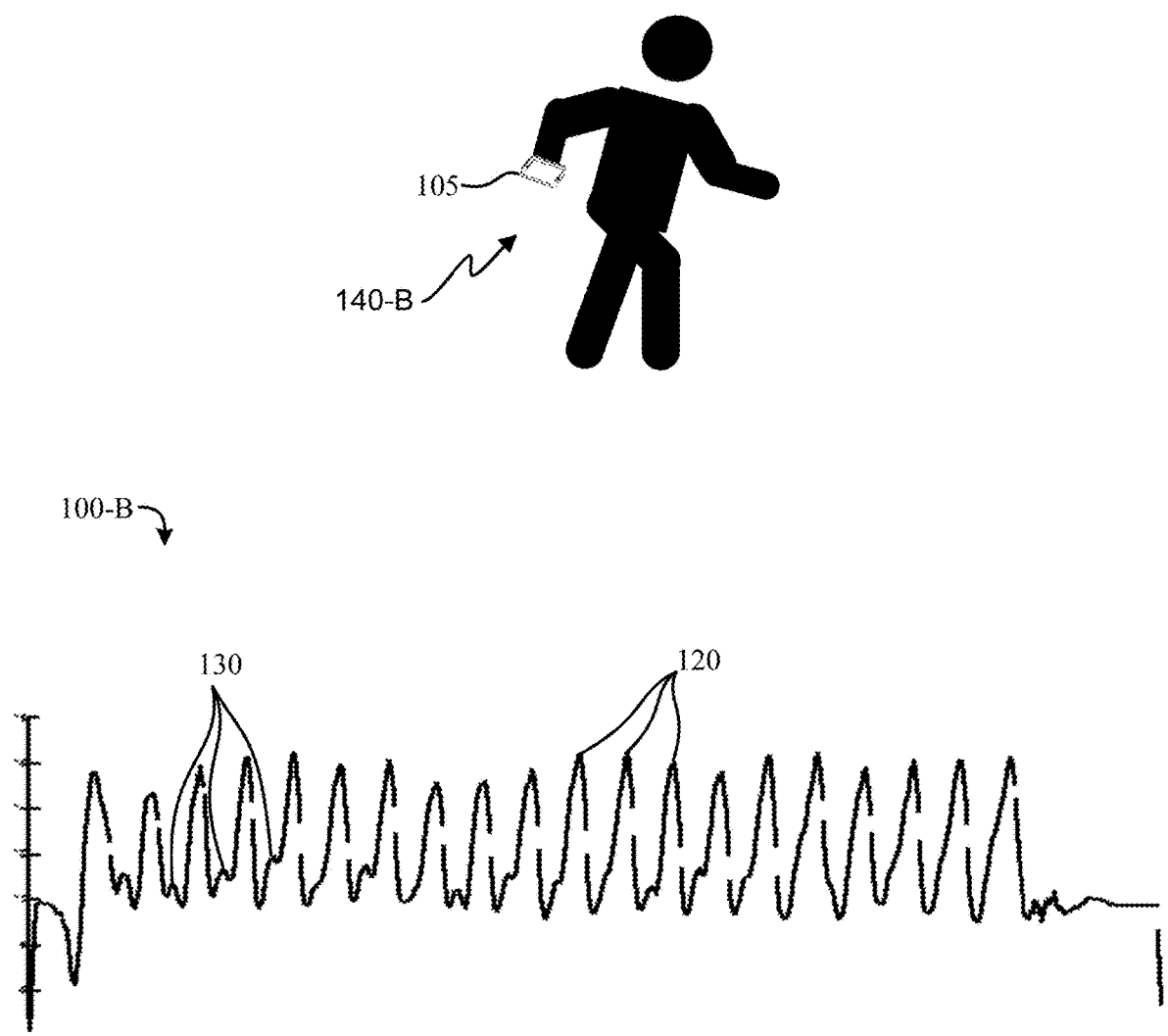
Figure 1C:
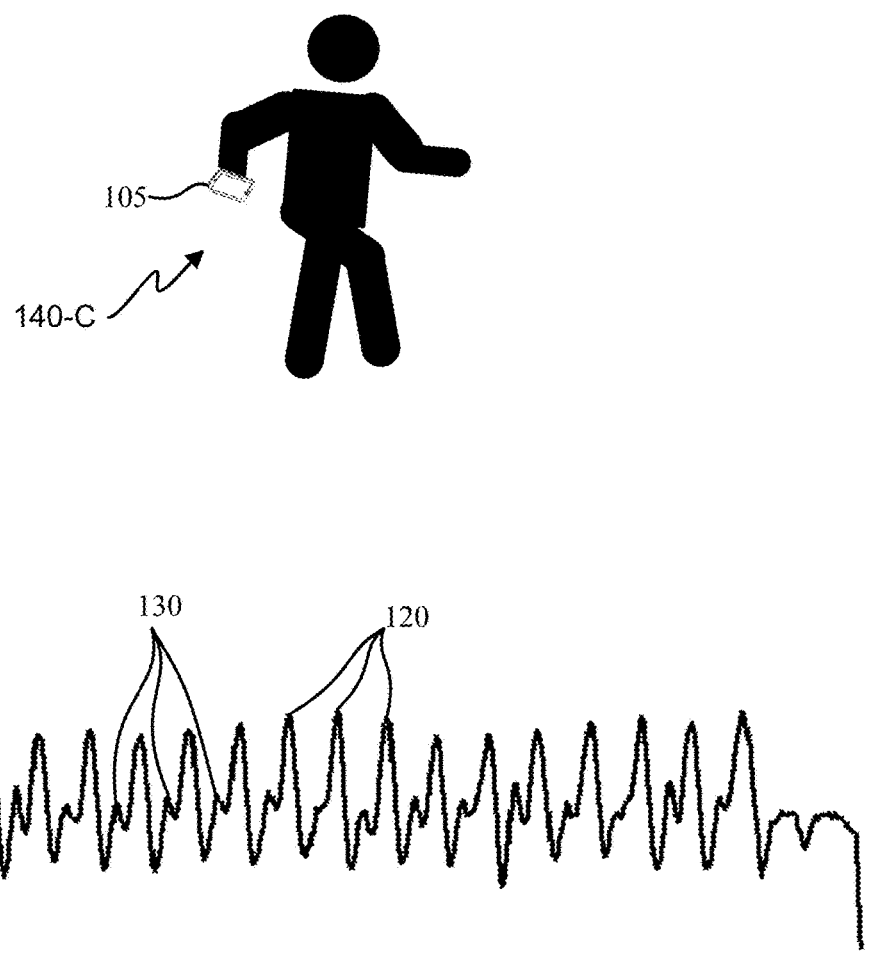

Real-time pedometers, for example running on a mobile device, may have a variety of applications, ranging from positioning to fitness monitoring, for example. Walking may cause a distinct periodic pattern in data from an accelerometer on the mobile device. FIG. 1A is a drawing with a plot 100-A of accelerometer data (shown as acceleration magnitude) from a mobile device 105 at the waist of a user when a user is engaged in a steady walk (at approximately two steps per second), as shown in the image 140-A. The data, sampled at 50 Hz, illustrates variations in acceleration, peaking at roughly 2-5 meters per second squared ($m/s^2$), centered at gravitational acceleration (approximately 9.8 $m/s^2$). Patterns in the accelerometer data may be used to detect walking and/or count steps. Here, the data is relatively straightforward: each peak 110 (ignoring smaller peaks that may appear on a larger one) corresponds with a step taken by the user. (Note: for simplicity, only a small subset of the peaks 110, 120, and 130 of the plots 100 of FIGS. 1A-1C are labeled.). While embodiments are described below with respect to an accelerometer, a gyroscope may additionally or alternatively be used in some embodiments.

FIG. 1B illustrates another acceleration plot 100-B, illustrating measured vertical acceleration over time, similar to FIG. 1A. Plot 100-B also shows how swinging the mobile device can make step detection (detection of a user taking a step, or "foot step detection") difficult. In this example, the mobile device 105 is in swinging back and forth in the user's hand while the user is walking at a fast pace, as shown in image 140-B. Here, the acceleration data has a distinguishable pattern, but large peaks 120 due to the swinging of the user's hand can often mask smaller peaks 130 that correlate with a user's steps. In plot 100-B, a single large peak 120 can mask two smaller peaks 130. In other words, each large peak 120 correlates to two steps taken by the user.

FIG. 1C illustrates an acceleration plot 100-C in which the mobile device 105 is in swinging back and forth in the user's hand (as shown in image 140-C) while the user is walking at a slower pace relative to plot 100-B. In this example, the larger peaks 120 are more likely to mask just one smaller peak 130 that correlates to a step rather than two.

Because swinging can significantly impact step detection, it can beneficial to determine whether swinging is occurring. Accordingly, techniques provided herein allow for increasing step detection accuracy in mobile devices by determining whether such swinging is taking place. According to the invention, swinging can be detected using threshold detection, Eigen analysis, and/or hybrid frequency analysis, as detailed herein. The determination that swinging is (or may be) occurring can impact how the mobile device reports detected steps for step detection. A count of missteps and/or a level of certainty, based on swing detection, can be provided with a step count.

Figure 2:
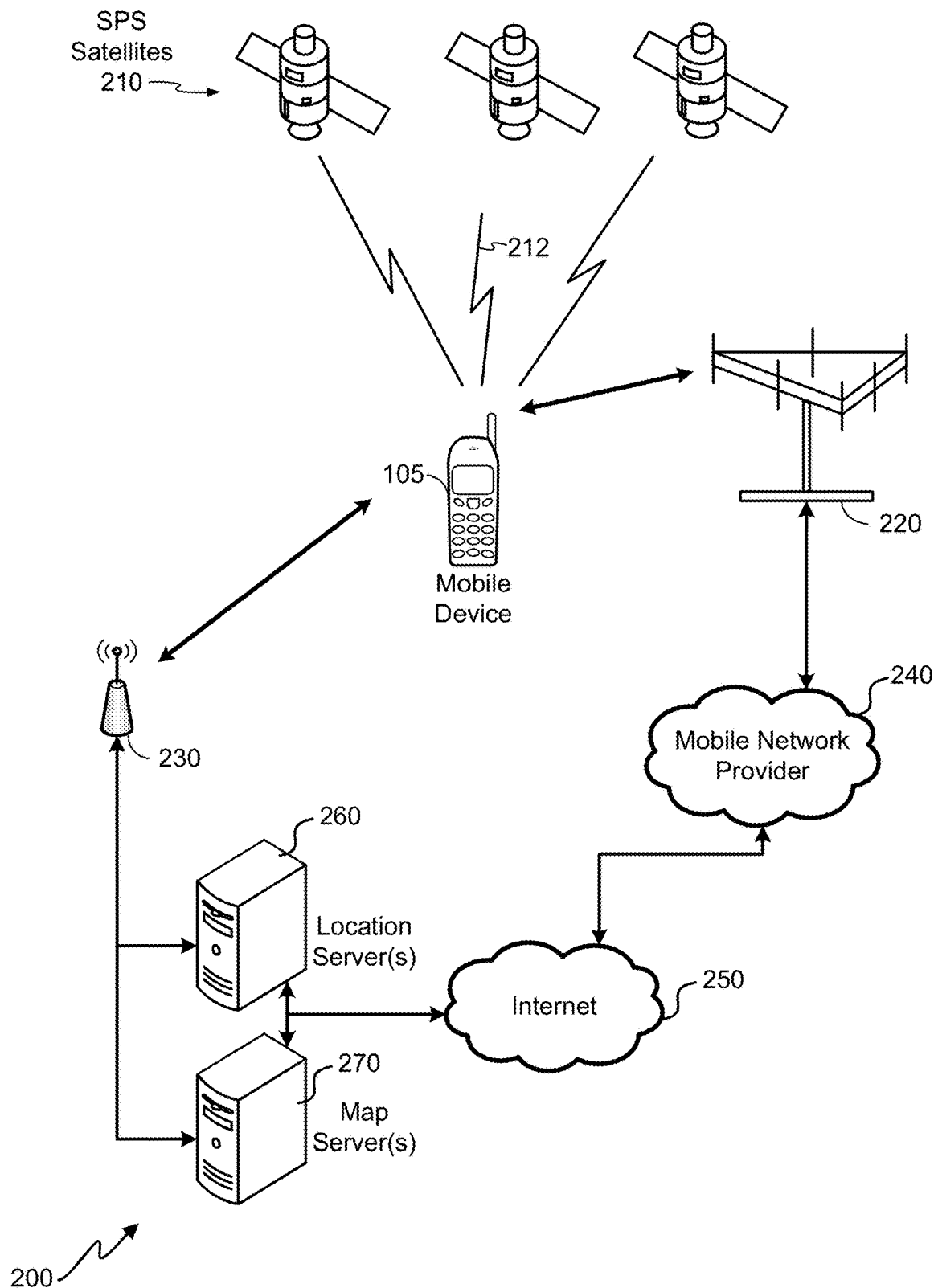
FIG. 2 is a simplified illustration of a positioning system that can utilize the techniques described herein, according to one embodiment.

FIG. 2, for example, is a simplified illustration of a positioning system 200 that can utilize the techniques described herein. A mobile device 105 and/or other components of the positioning system 200 can process various data points to determine the position of the mobile device 105. Such data points can include step detection using the techniques described herein below. The positioning system can include a mobile device 105, satellite positioning service (SPS) satellites 210, base transceiver station(s) 220, mobile network provider 240, access point(s) 230, location server(s) 260, map server(s) 270, and the Internet 250. It should be noted that FIG. 2 provides only a generalized illustration of various components, any or all of which may be utilized as appropriate. Moreover, different components may be added, omitted, combined, and/or separated, as desired. A person of ordinary skill in the art will recognize many modifications to the components illustrated. Furthermore, the positioning system 200 illustrated in FIG. 2 is provided as an example system in which step detection techniques provided herein can be used. However, embodiments are not so limited. As indicated previously, step detection techniques provided herein can be utilized in a variety of devices other than the mobile device 105 of FIG. 2, and for a variety of applications other than positioning.

In the positioning system 200, a location of the mobile device 105 can be determined a variety of information. For example, the location of the mobile device 105 can be calculated using triangulation and/or other positioning techniques with information transmitted from SPS satellites 210. In these embodiments, the mobile device 105 may utilize a receiver specifically implemented for use with the SPS that extracts position data from a plurality of signals 212 transmitted by SPS satellites 210. Transmitted satellite signals may include, for example, signals marked with a repeating pseudo-random noise (PN) code of a set number of chips and may be located on ground based control stations, user equipment and/or space vehicles. Satellite positioning systems may include such systems as the Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like.

Embodiments may also use communication and/or positioning capabilities provided by base transceiver stations 220 and mobile network provider 240 (e.g., a cell phone service provider), as well as access point(s) 230. Communication to and from the mobile device 105 may thus also be implemented, in some embodiments, using various wireless communication networks. The mobile network provider 240, for example, can comprise such as a wide area wireless network (WWAN). The access point(s) 230 can be part of a wireless local area network (WLAN), a wireless personal area network (WPAN), and the like. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may implement Long Term Evolution (LTE), LTE Advanced, and so on. LTE, LTE Advanced, GSM, and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

Mobile network provider 240 and/or access point(s) 230 can further communicatively connect the mobile device 105 to the Internet 250. Other embodiments may include other networks in addition, or as an alternative to, the Internet 250. Such networks can include any of a variety of public and/or private communication networks, including wide area network (WAN), local area network (LAN), and the like. Moreover, networking technologies can include switching and/or packetized networks utilizing optical, radio frequency (RF), wired, satellite, and/or other technologies.

The access point(s) 230 be used for wireless voice and/or data communication with the mobile device 105, as well as independents sources of position data, e.g., through implementation of trilateration-based procedures based, for example, on RTT and/or RSSI measurements. Further example embodiments of determining position of a mobile device using access point(s) 230 are provided in U.S. patent application Ser. No. 13/398,653, entitled "MEASUREMENTS AND INFORMATION GATHERING IN A WIRELESS NETWORK ENVIRONMENT," the content of which is hereby incorporated by reference in its entirety. The access point(s) 230 can be part of a WLAN that operates in a building to perform communications over smaller geographic regions than a WWAN. The access point(s) 230 can be part of a WiFi network (802.11x), cellular piconets and/or femtocells, Bluetooth network, and the like. The access point(s) 230 can also form part of a Qualcomm indoor positioning system (QUIPS™). Embodiments may include any number of access point(s) 230, any of which may be a moveable node, or may be otherwise capable of being relocated.

In addition to the various components of the positioning system 200 illustrated in FIG. 2, the mobile device 105 can utilize data from internal components to assist in position determination. For example, the mobile device 105 can include a variety of sensors, such as gyroscopes, accelerometers, micro-electromechanical system (MEMS) sensors used as linear accelerometers, gravimeters, as well as magnetometers. For example, the sensors may comprise a gyroscope and an accelerometer in some embodiments. In some embodiments, the sensors comprise or are included in an inertial navigation system (INS). The INS may comprise an attitude-only-INS, for example using only gyroscope information. In some embodiments, the INS comprises a 6 degree-of-freedom (DOF) INS, for example that uses both accelerometer and gyroscope measurements. In some embodiments, the INS determines gravity, which can be represented by a gravity vector, for example in a fixed target frame. As indicated above such sensors can be utilized in step detection for a pedometer, which can complement and/or further improve the accuracy of location determinations. Such internal sensors can be particularly beneficial for positioning when the SPS receiver of the mobile device 105 is unable to receive sufficient information from SPS satellites for a position determination, such as in indoor environments.

Figure 3:
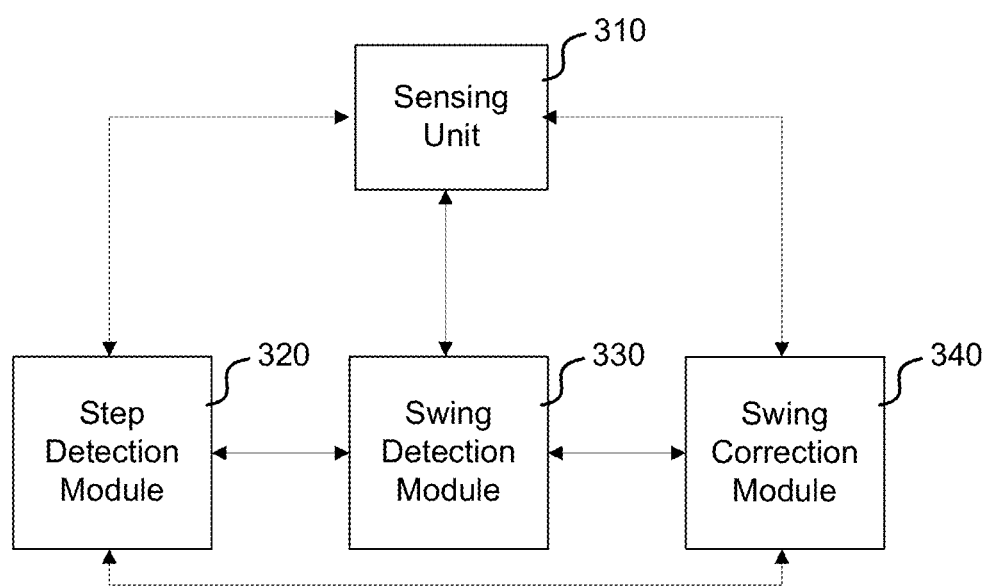
FIG. 3 is an example block diagram of components that can be utilized by a mobile and/or other device to implement the methods of improved step detection described herein.

Step detection accuracy in mobile devices, such as mobile device 105 of FIG. 2, can be improved by determining whether swinging is taking place and accounting for swinging if it is occurring. FIG. 3 illustrates an example block diagram of components that can be utilized by a mobile and/or other device to implement the methods of improved step detection described herein. In the illustrated embodiment, components may include a step detection module 320, swing detection module 330, and/or a swing correction module 340. These components may be implemented in the software and/or hardware of a mobile device as described in more detail below with regard to FIG. 15. In some embodiments, the swing correction module 340 can implement swing correction and/or swing compensation. In some embodiments, the number of elements may be greater or fewer than the number shown. In some embodiments, a greater or fewer number of module couplings may exist, and/or the couplings may be unidirectional in either direction or bidirectional. While the modules 320, 330, and 340 are illustrated separate from the sensing unit 310, all or a portion of each of the modules may be implemented in combination with the sensing unit 310.

The functionality of each module can vary, depending on desired functionality. Sensing unit 310 can include one or more accelerometers, gyroscopes, and/or other sensors capable of providing data indicative of movement of a mobile device, such as sensors 1540 described in more detail below with regard to FIG. 15. Step detection module 320 can be configured to receive input from the sensing unit 310 and/or swing detection module 330 and detect whether or not a user of the mobile device has made a step. Swing detection module 330 can receive input from the sensing unit 310 and/or swing correction module 340 to determine whether the mobile device is in a swing state (e.g., swinging in the arm of the mobile device user).

Embodiments herein can utilize one or more techniques for swing detection, which may be executed by the swing detection module 330. Embodiments may further use this swing detection to differentiate walking (e.g., image 140-A of FIG. 1A) from swinging the mobile device in the hand while walking (e.g., images 140-B and 140-C of FIGS. 1B and 1C, respectively) (also referred to herein as a "swing state"), and correct detected steps accordingly. Further, swing detection may be beneficial for other applications such as estimating the alignment of the user using inertial sensors.

Threshold Detection

As indicated previously with regard to FIGS. 1B and 1C, swinging a mobile device while walking typically result in larger peaks in acceleration data collected by the mobile device than by walking alone. This is because, during a swing, a centrifugal force can act on the mobile device in addition to gravity and the forces due to walking. The orientation of the centrifugal force may be almost constant with respect to the device, resulting in larger variations in acceleration data. Swinging may therefore be detected by simply determining whether acceleration data meets or exceeds a certain threshold.

Figure 4:
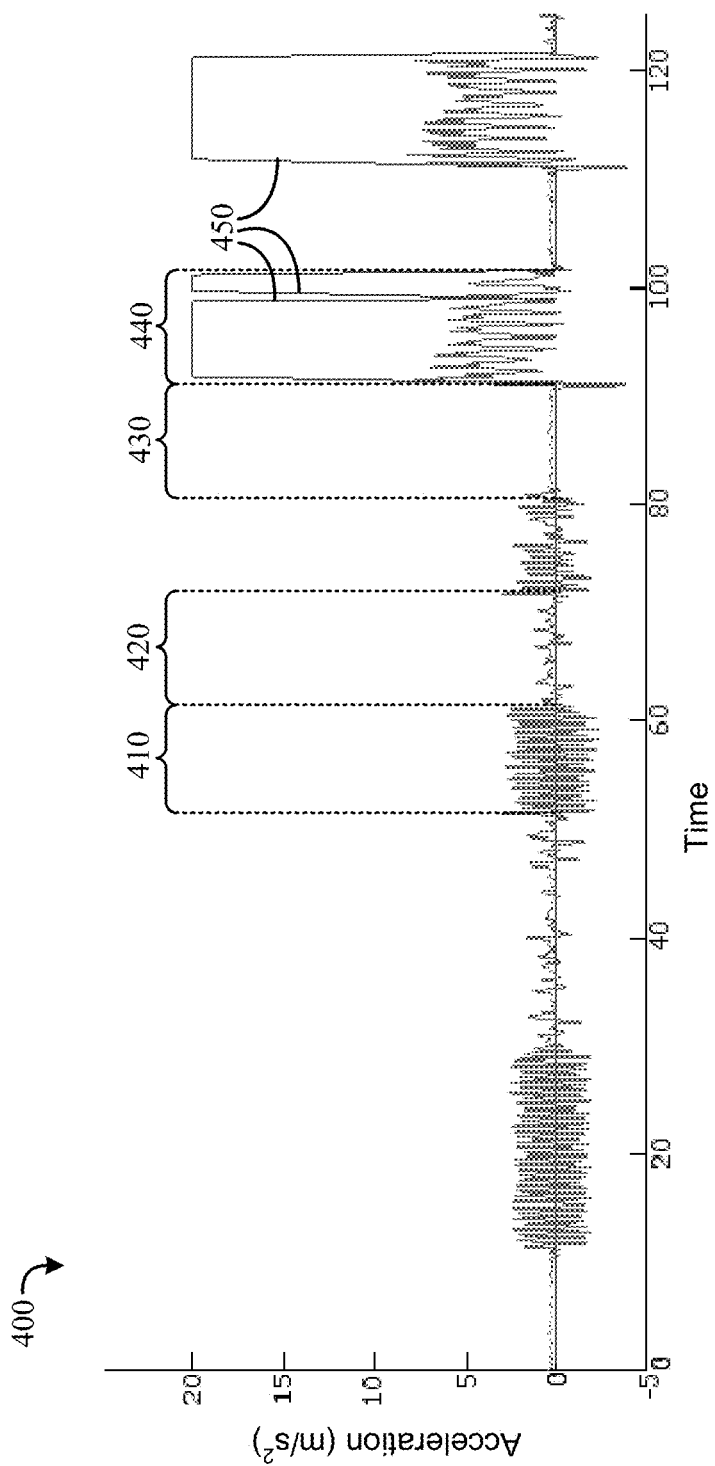
FIG. 4 is a plot of acceleration magnitude from a mobile device during a sequence of activities.

FIG. 4 is a plot 400 of acceleration magnitude from a mobile device during a sequence of activities, showing how a threshold can be utilized to determine swinging using acceleration data. Here, acceleration data represents vertical acceleration, offset for gravity to center the data at zero acceleration. In some embodiments, acceleration data can include total magnitude (e.g., data from all 3 axes of an accelerometer), or a combination of more than one axis of an accelerometer. Other embodiments may not offset gravitational acceleration.

Different activities can be determined from different patterns of the acceleration data. For example, the pattern exhibited in a first time period 410 represents walking Time period 420 shows random acceleration due to fidgeting, and time period 430 shows when the mobile device is held still. Larger acceleration swings at time period 440 represent a user swinging the device in a hand while walking. As shown, swings in acceleration are larger than acceleration swings due to other activities. A threshold can therefore be set, for example, such that any acceleration at or above the threshold can indicate a swing. In this example, the threshold is at approximately 2.5 m/s$^2$. In embodiments in which acceleration is offset by gravity, the threshold can be between 10 and 12 m/s$^2$. Other embodiments may include thresholds higher or lower than these examples.

When a threshold is met or exceeded, a signal can be generated to indicate swinging. For example, in addition to acceleration data, the plot 400 of FIG. 4 also shows a signal 450 generated to indicate swinging. This signal can be generated, for example, by the swing detection module 330 of FIG. 3. The amplitude and frequency of the signal can vary, depending on desired functionality.

Figure 5:
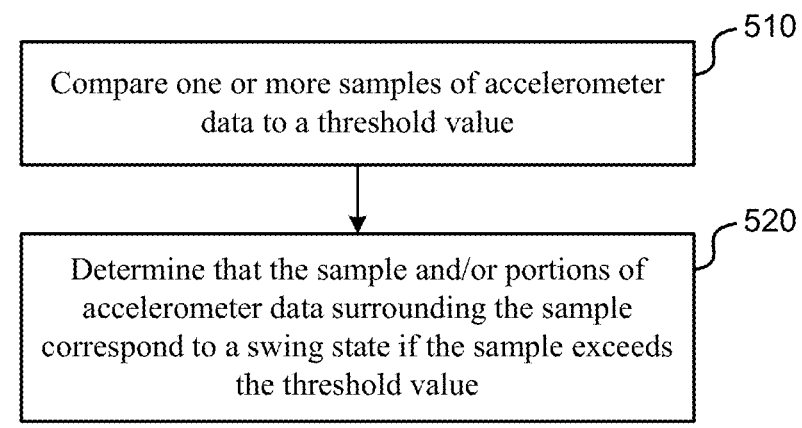
FIG. 5 is a flow diagram of an example method of swing detection.

FIG. 5 is a flow diagram of an example method 500 of swing detection. In some embodiments, the method 500 can be performed by the swing detection module 330 of FIG. 3. Additionally or alternatively, means for performing one or more of the components of the method 500 can include hardware and/or software means described in further detail in relation to FIG. 15. Components of the method 500, although illustrated in a particular order, may be performed in a different order and/or simultaneously, according to different embodiments. Moreover, a person of ordinary skill in the art will recognize many additions, omissions, and/or other variations.

At block 510, one or more samples of accelerometer data can be compared to a threshold value. As stated previously, the threshold value can vary depending on a variety of factors, such as the type of acceleration data being analyzed (e.g., a single axis of an accelerometer or multiple axes), desired sensitivity, an identity of a mobile device user, and so forth. In some embodiments, the threshold may be modified by the device and/or a remote system based on received acceleration values from the user and/or other mobile device users. This allows a device to increase accuracy of threshold-based swing detection by learning from one or more users over time. Means for providing the functionality at block 510 can include, for example, processing unit(s) 1510, memory 1560, and/or other components of a mobile device 105 as described below in relation to FIG. 15.

At block 520, the sample and/or portions of accelerometer data surrounding the sample are determined to correspond to a swing state if the sample exceeds the threshold value. In some embodiments, a plurality of samples may be compared, and the determination may be made based on one of the samples or multiple samples. In some embodiments, a swing state can be determined if a majority of samples within a window are over the threshold. In some embodiments, a swing state can be determined if any of the samples are over the threshold. Means for providing the functionality at block 520 can include, for example, processing unit(s) 1510, memory 1560, and/or other components of a mobile device 105 as described below in relation to FIG. 15.

Eigen Analysis

Eigenvalues of acceleration data over a certain window can additionally or alternatively be computed to determine whether swinging is occurring. Embodiments utilizing this Eigen analysis can include calculating, for a window of time the eigenvalues of acceleration data from one or more axes of the accelerometer. The window of time with which eigenvalues are calculated can vary, depending on desired functionality. In some embodiments, the window of time can be calculated to include 2 peaks of acceleration data. Other embodiments may simply include a window of time that is a few seconds in length.

Figure 6:
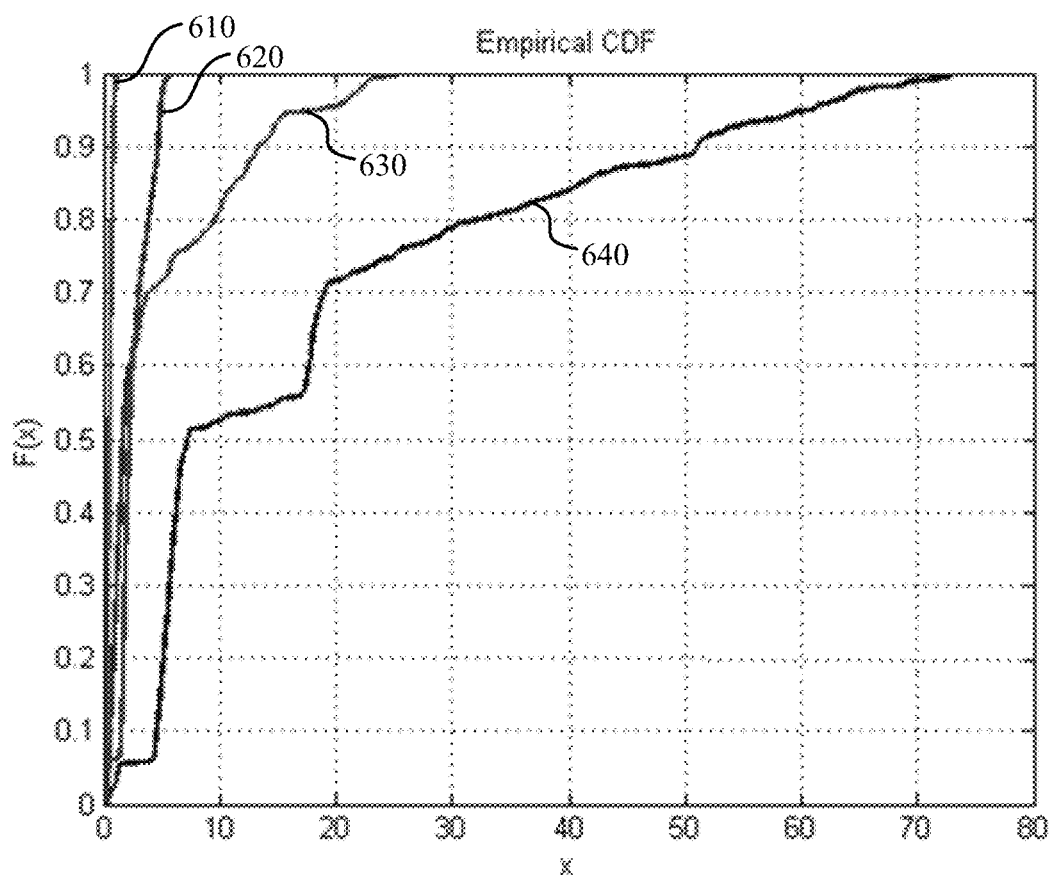
FIG. 6 is a cumulative distribution function plot illustrating variation in eigenvalues for swinging and non-swinging states.

Eigenvalues reflect variance in data. Swinging results in large amounts of variance in acceleration data. Thus, when a mobile device is subject to swinging, eigenvalues of acceleration data may be significantly larger than during normal walk. FIG. 6 is a cumulative distribution function graph 600 illustrating variation in eigenvalues for swinging and non-swinging states, showing increased variance in values (x axis) with an increased data points for computing eigenvalues (y axis). Plots 640 and 630 represent first and second eigenvalues while a mobile device is in a swing state, which are much higher than first and second eigenvalues calculated while the mobile device is at a stationary position relative to a user while the user is walking, as illustrated in plots 610 and 620. This difference in eigenvalues while the mobile device is in these two states (swinging while walking and walking only) can facilitate the detection of the two states.

Eigen analysis for swing detection may not utilize all axes of an accelerometer. Where only 1 or 2 axes are used, embodiments can also include determining which axis(es) has(have) the most variance in data and using that data to calculate the eigenvalues. The eigenvalues can be compared with predetermined thresholds to determine whether swinging is occurring. Embodiments can include combined thresholds, separate thresholds (e.g., one for each axis), and/or ratios (e.g., whether a ratio of eigenvalue1 to eigenvalue2 meets or exceeds a threshold).

Figure 7:
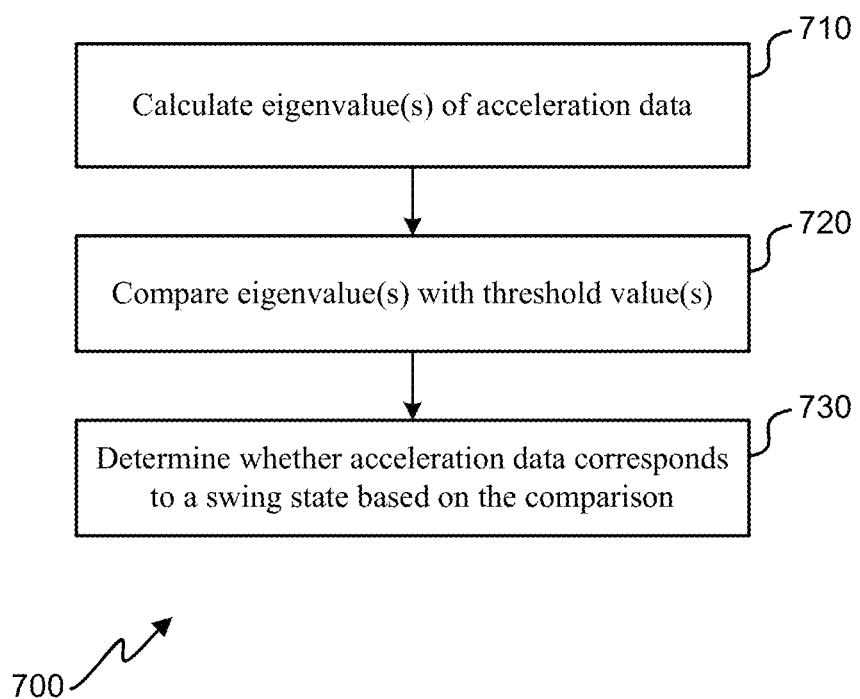
FIG. 7 is a flow diagram of an example method of swing detection using Eigen analysis.

FIG. 7 is a flow diagram of an example method 700 of swing detection using Eigen analysis. In some embodiments, the method 700 can be performed by the swing detection module 330 of FIG. 3. Additionally or alternatively, means for performing one or more of the components of the method 700 can include hardware and/or software means described in further detail in relation to FIG. 15. Components of the method 700, although illustrated in a particular order, may be performed in a different order and/or simultaneously, according to different embodiments. Moreover, a person of ordinary skill in the art will recognize many additions, omissions, and/or other variations.

At block 710, one or more eigenvalues of acceleration data are calculated. In some embodiments, only the eigenvalues showing the most variance are used. These eigenvalues typically correspond with accelerometer axes in which a device's forward/backward movement and vertical movement in relation to a user are manifest (as opposed to side-to-side movement of a device in relation to a user). Means for providing the functionality at block 710 can include, for example, processing unit(s) 1510, memory 1560, and/or other components of a mobile device 105 as described below in relation to FIG. 15.

At block 720, the one or more eigenvalues are compared with one or more threshold values, and at block 730, it is determined whether acceleration data corresponds to a swing state based on the comparison at block 720. In some embodiments, a first and second eigenvalue may be compared to a single threshold, or to two respective thresholds. In some embodiments, a swing state is determined if both eigenvalues are determined to correspond to a swing state. In some embodiments, a swing state is determined if either of the eigenvalues correspond to a swing state. Additionally or alternatively, the comparison at block 720 can involve determining whether a ratio of two eigenvalues (e.g., ratio of largest eigenvalue to smallest eigenvalue) exceeds a threshold. Means for providing the functionality at blocks 720 and/or 730 can include, for example, processing unit(s) 1510, memory 1560, and/or other components of a mobile device 105 as described below in relation to FIG. 15.

During a swing state, there may be a greater variation in the orientation of the mobile device with respect to vertical as compared to normal walk. In some embodiments, gravity may be estimated. For example, a low-pass filter on acceleration data (for example from the sensing unit 310 of FIG. 3) may be used to estimate the direction of gravity. The angle made by the current acceleration vector with gravity may be calculated and compared against a threshold to detect a swing state. The low-pass filter may be included in the swing correction module 340 of FIG. 3 and/or implemented in other hardware and/or software of a mobile device, as described in further detail below with regard to FIG. 15.

Hybrid Frequency Analysis

A frequency analysis of acceleration data for swing detection can be accurate, but may cause delay because a frequency analysis typically requires data from a large window of time. Peak detection, on the other hand, has little or no delay, but may not be as accurate as a frequency analysis. With this in mind, embodiments may employ a hybrid frequency analysis in which autocorrelation (or another frequency analysis) can be performed on the acceleration data to determine, for a given moment in time, whether the data has periodicity and, if so, its frequency. Techniques for hybrid frequency analysis described below are with respect to autocorrelation, but those having skill in the art will appreciate that other frequency analysis techniques may be used to extract features. For example, a Fourier transform such as an FFT may be used in some embodiments.

Frequency analysis techniques, such as autocorrelation, may be used to detect if a signal from an accelerometer of a mobile device is periodic, and may further be used to estimate the dominant frequency. In many situations, the dominant frequency corresponds to the step-rate of user wearing or carrying the mobile device.

Autocorrelation can be used, for example over a small window of acceleration data, to determine whether a signal representing the data is periodic and/or if a frequency of the signal lies within a range that is expected for walking and/or running.

In some embodiments, autocorrelation may use the following formula:

$$R(\tau) = \frac{E[(A_t - \mu_t)(A_{t+\tau} - \mu_{t+\tau})]}{\sigma_t \sigma_{t+\tau}} \quad (1)$$

Figure 8:
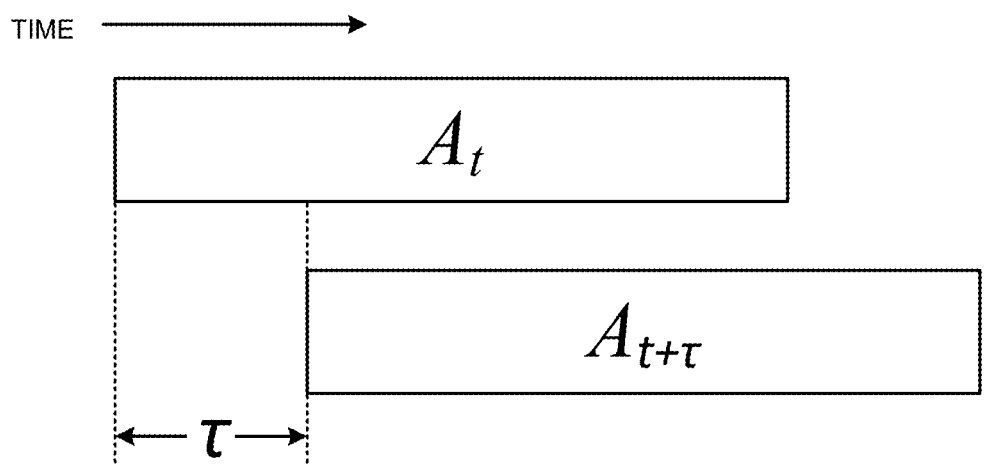
FIG. 8 is a simplified timing diagram that helps illustrate variables of an autocorrelation formula.

FIG. 8 is a simplified timing diagram that helps illustrate $A_t$, $A_{t+\tau}$, and $\tau$ used in equation (1). Blocks $A_t$ and $A_{t+\tau}$, represent data from windows of time, separated by $\tau$. The stronger $A_t$ and $A_{t+\tau}$ correlate, the higher the output $R(\tau)$. The autocorrelation may be computed over a fixed time window of acceleration for a fixed range of lag values, $\tau$. In some embodiments, for example, a range of lag values can be from 0.3-2 seconds.

If no window of time is available for the frequency of analysis (e.g., the process has just begun) a nominal step rate can be assumed. In some embodiments, for example, the nominal step rate of 2 steps per second can be assumed. In other embodiments different step rates may be assumed, which can be faster or slower than the rate of 2 steps per second. Some embodiments, for example, may provide a customized nominal step rate based on historical data, information regarding a user of the mobile device, and/or other data. Assuming a nominal step rate, in this matter can prevent a time delay in the frequency analysis.

If autocorrelation exceeds a threshold value, it indicates periodicity. In some embodiments, a threshold value may be 0.6, although other embodiments may have different threshold values (e.g., 0.50, 0.55, 0.65, 0.70, 0.75, 0.80, etc.), depending on desired functionality. If periodicity is detected and the frequency is within a range of known step rates (e.g., 0.3-2 second per step), then stepping may be occurring. If the frequency, when doubled, falls within this range (e.g., one peak per two steps, as in plot 100-B of FIG. 1B), swinging may additionally/alternatively be occurring.

Figure 9A:
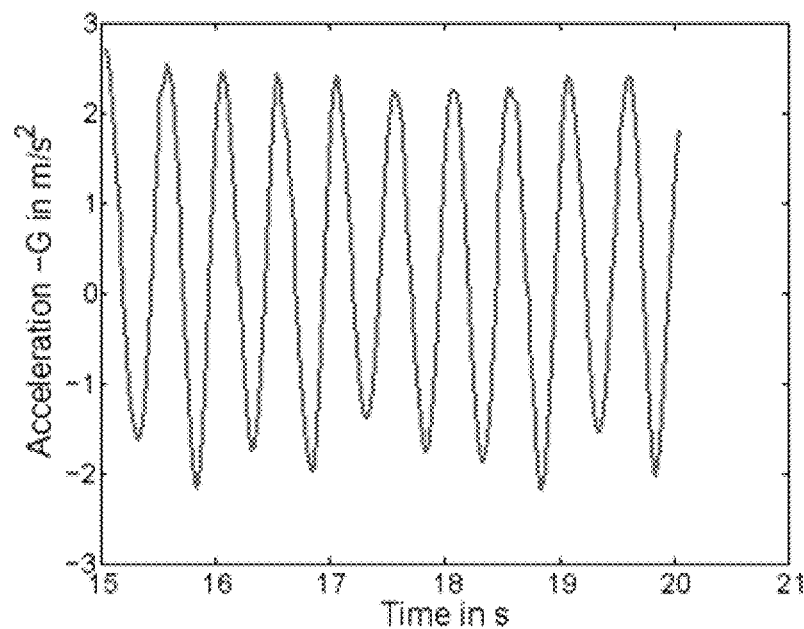
FIGS. 9A and 9B are plots used to illustrate how autocorrelation can detect periodicity.
Figure 9B:
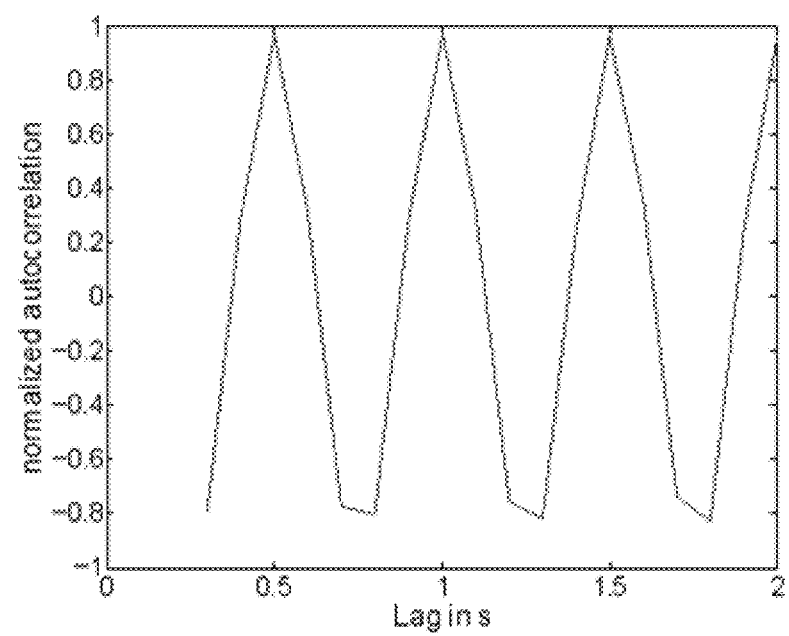

FIGS. 9A and 9B illustrate how autocorrelation can detect periodicity. FIG. 9A is an acceleration plot showing peaks in acceleration data at roughly every half second. FIG. 9B is a plot showing autocorrelation of the data of FIG. 9A for lag values, $\tau$, ranging from 0.3 to 2 seconds. Peaks in autocorrelation occur at lag values 0.5, 1, 1.5, and 2, indicating a periodicity of approximately 2 peaks per second. In this example, because the frequency, when doubled falls outside a range of step rates (i.e., 0.25 seconds per step is below the range of 0.3-2 seconds per step), swinging may not be occurring. Of course, other embodiments may utilize ranges and/or factors to determine if swinging is occurring.

Figure 10:
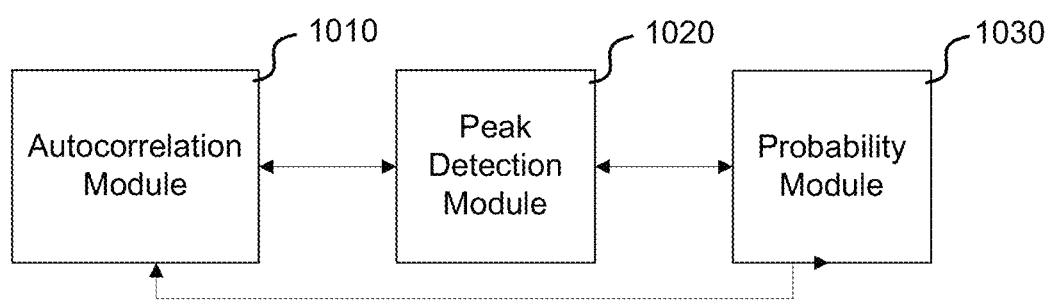
FIG. 10 is an example block diagram of components that can be utilized by a mobile and/or other device to implement the methods of improved step detection described herein.

FIG. 10 illustrates an example block diagram of components that can be utilized by a mobile and/or other device to implement the methods of improved step detection described herein. In the illustrated embodiment, components may include an autocorrelation module 1010, peak detection module 1020, and/or a probability module 1030. Similar to modules shown in FIG. 3, these components may be implemented in the software and/or hardware of a mobile device as described in more detail below with regard to FIG. 15. In some embodiments, one or more of the modules 1010, 1020, and 1030 are implemented in the step detection module 320 of FIG. 4. In some embodiments, one or more of the modules 1010, 1020, and 1030 may be implemented instead or in addition in swing detection module 330 and/or swing correction module 340 of FIG. 3. In some embodiments, one or more of the modules 1010, 1020, and 1030 are implemented separate from one or more of the modules 320, 330, and 340 of FIG. 3. In some embodiments, the number of module couplings may be greater or fewer than the number shown, and/or the couplings may be unidirectional in either direction or bidirectional. All or a portion of each of the modules 1010, 1020, and 1030, described in further detail below, may be implemented in combination with the sensing unit 310.

Figure 11:
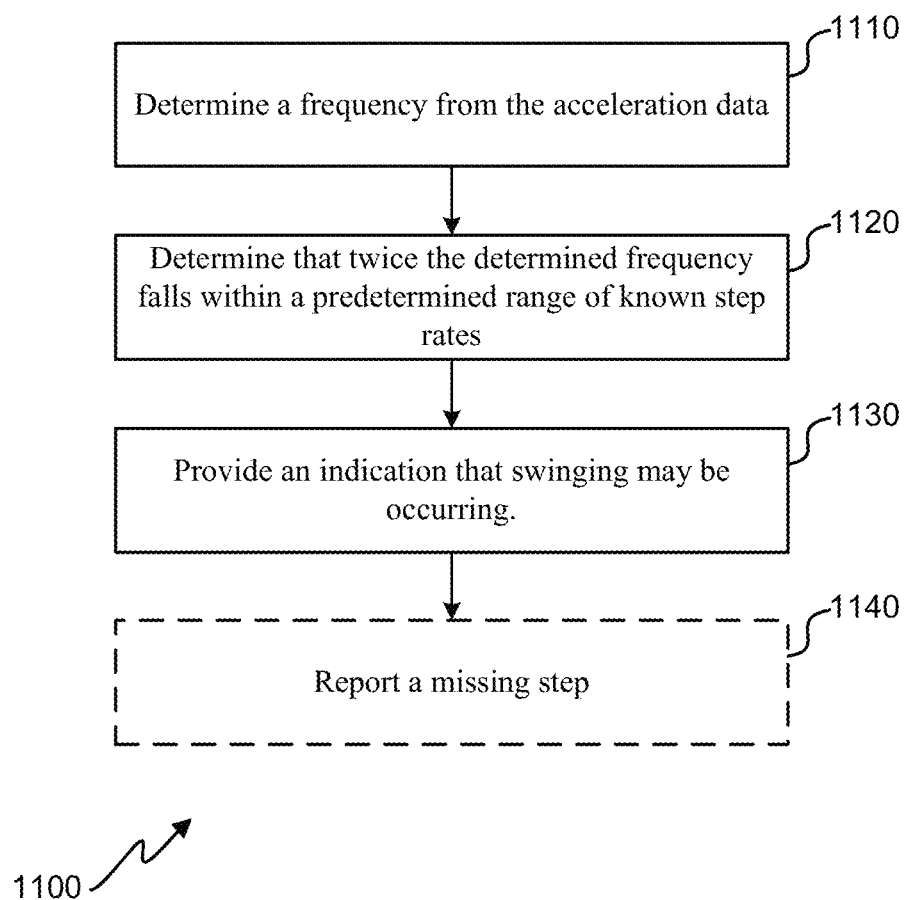
FIG. 11 is a flow diagram of an example method of swing detection using hybrid frequency analysis.

FIG. 11 is a flow diagram of an example method 1100 of swing detection using hybrid frequency analysis. In some embodiments, the method 1100 can be performed by the swing detection module 330 of FIG. 3 and/or modules 1010, 1020, and/or 1030 of FIG. 10. Additionally or alternatively, means for performing one or more of the components of the method 1100 can include hardware and/or software means described in further detail in relation to FIG. 15. Components of the method 1100, although illustrated in a particular order, may be performed in a different order and/or simultaneously, according to different embodiments. Moreover, a person of ordinary skill in the art will recognize many additions, omissions, and/or other variations.

At block 1110, a frequency is determined from the acceleration data. For example, autocorrelation module 1010 can receive acceleration data from sensing unit 310. If autocorrelation does not detect periodic activity, a nominal step-rate (e.g., 2 steps per second) may be assumed in some embodiments. Means for providing the functionality at block 1110 can include, for example, processing unit(s) 1510, memory 1560, and/or other components of a mobile device 105 as described below in relation to FIG. 15.

At block 1120, it is determined that twice the determined frequency falls within a predetermined range of known step rates. As illustrated in FIG. 1B, this can be indicative of swinging, which can cause peaks in acceleration data at half a walking rate. As indicated previously. Means for providing the functionality at block 1120 can include, for example, processing unit(s) 1510, memory 1560, and/or other components of a mobile device 105 as described below in relation to FIG. 15.

At block 1130, an indication that swinging may be occurring can be provided. The indication can be, for example, a signal from a swing detection module 330 to a step detection module 320. Depending on desired functionality, the indication can be binary (e.g., swinging is occurring) or may be indicative of a softer measure (e.g., a probability that swinging is occurring). Probabilities can be based on any of a variety of factors, such as a comparison of historical data regarding step frequency of a user with the determined frequency. Means for providing the functionality at block 1130 can include, for example, processing unit(s) 1510, memory 1560, output device(s) 1515, wireless communication interface 1530, and/or other components of a mobile device 105 as described below in relation to FIG. 15.

Optionally, at block 1140, because a steps may be occurring at twice the rate of the determined frequency (as determined at block 1120), then a "missing step" may be indicated for each peak that may correlate to two steps (e.g., where a step may otherwise go undetected). This may correspond to a scenario such as illustrated in FIG. 1B, where swinging masks half the peaks due to walking Means for providing the functionality at block 1140 can include, for example, processing unit(s) 1510, memory 1560, output device(s) 1515, wireless communication interface 1530, and/or other components of a mobile device 105 as described below in relation to FIG. 15.

In some embodiments, missing steps can be reported, for example as a separate value in an application programming interface (API), so that an application such as a pedometer, health or context awareness application, fitness application, etc. can decide how they should be used. In other embodiments, missing steps may be deducted from a step count (by, for example, the step detection module 320) before a step count is provided via the API. In some embodiments, the step detection module can correct the steps based on probability information (e.g., from probability module 1030). Those having skill in the art will appreciate other methods of utilizing a step or missed step determination.

Figure 12:
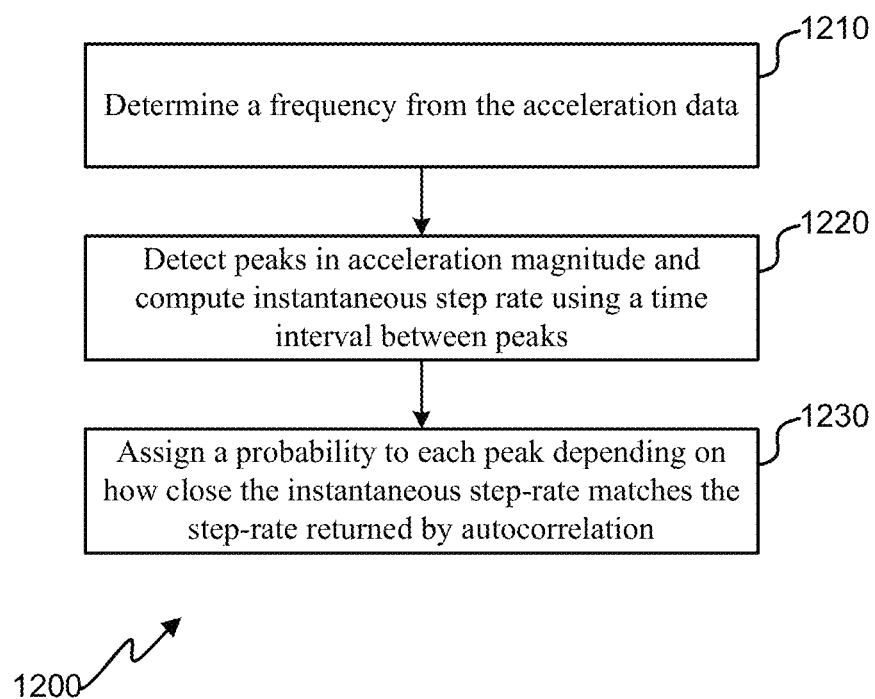
FIG. 12 is a flow diagram of an example method of step detection using hybrid frequency analysis.

Components used for hybrid frequency analysis (e.g., modules of FIG. 10) can additionally or alternatively be used for step determination. FIG. 12 is a flow diagram of an example method 1200 of step detection using hybrid frequency analysis. As with FIG. 11, means for performing one or more of the components of the method 1200 of FIG. 12 can include hardware and/or software means described in further detail in relation to FIG. 15. Components of the method 1200, although illustrated in a particular order, may be performed in a different order and/or simultaneously, according to different embodiments. Moreover, a person of ordinary skill in the art will recognize many additions, omissions, and/or other variations.

At block 1210, similar to block 1110, a frequency is determined from the acceleration data. And a nominal step-rate (e.g., 2 steps per second) may be assumed where no periodic activity is initially detected. Means for providing the functionality at block 1210 can include, for example, processing unit(s) 1510, memory 1560, and/or other components of a mobile device 105 as described below in relation to FIG. 15.

At block 1220, peaks in acceleration magnitude, for example from the sensing unit 310, may be detected and an instantaneous step rate may be computed using a time interval between peaks. In some embodiments, the peak detection module 1020 may perform the functionality at block 1220. The peak detection may, for example, comprise computing a spread, Δ, of acceleration magnitude using the following formula:

$$\Delta = (a_{max} - a_{min}) \times \text{sign}(\text{index}_{max} - \text{index}_{min}) \quad (2)$$

Figure 13:
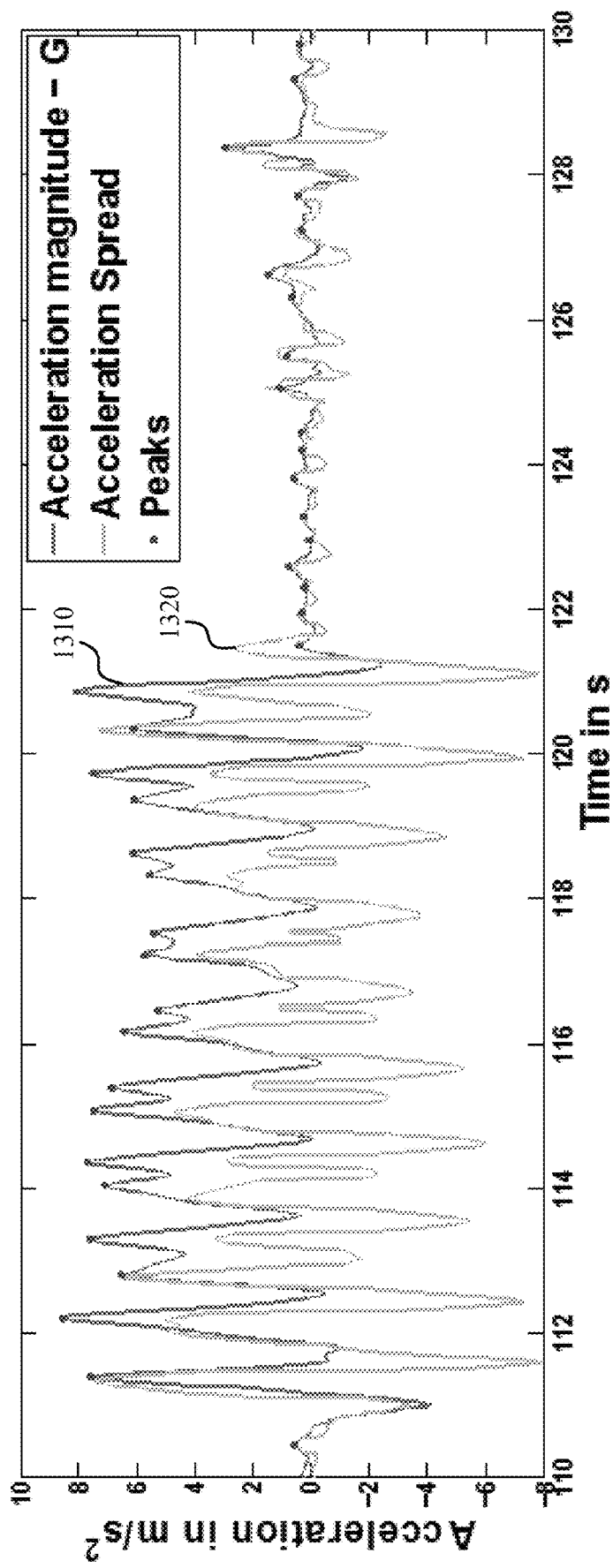
FIG. 13 is a plot of acceleration magnitude, acceleration spread, and detected peaks (indicated as dots on the acceleration magnitude).

A change in sign can indicate a peak or valley. Examples of acceleration spread and peaks are illustrated in FIG. 13, which plots acceleration magnitude 1310, acceleration spread 1320, and detected peaks (indicated as dots on the acceleration magnitude). Means for providing the functionality at block 1220 can include, for example, processing unit(s) 1510, memory 1560, and/or other components of a mobile device 105 as described below in relation to FIG. 15.

At block 1230, a probability (e.g., step probability) may be assigned or determined, for example by the probability module 1030 of FIG. 10. Probability can be based on any of a variety of factors. In some embodiments, for example, probability can be based on the how close the instantaneous step-rate at block 1220 matches the step-rate returned by autocorrelation at block 1210. Means for providing the functionality at block 1230 can include, for example, processing unit(s) 1510, memory 1560, and/or other components of a mobile device 105 as described below in relation to FIG. 15.

Table 1 illustrates example code for calculating step probability, according to one embodiment:

TABLE 1

Example Code for Calculating Step Probability

```
SIG_DT = 0.1;
diffT = abs(deltaT-mu_dt) ;
if(diffT<SIG_DT)
    p_step = 0.9;
elseif(diffT<2*SIG_DT)
    p_step = 0.5;
else
    p_step = 0.3;
end
```

In Table 1, mu_dt can represent stride duration returned by autocorrelation, and deltaT can represent time between consecutive peaks, for example as illustrated in FIG. 13. In some embodiments, deltaT may be close to mu_dt. In some embodiments, the probability of a step is high if deltaT is close to mu_dt and small otherwise. Based on the probability, steps may be detected by the mobile device. The syntax and format of the code in Table 1 can vary, depending on desired functionality.

Gyroscope-Based Analysis

Previously-described embodiments provide swing detection based on acceleration data from, for example, an accelerometer. Accelerometers can be desirable for swing detection in a mobile device when power savings is an issue, due to the relatively low power usage of accelerometers as compared with other components that may be helpful in swing detection, such as gyroscopes. Nonetheless, a mobile device may use a gyroscope for swing detection in certain circumstances, such as when power savings is not necessarily at issue, or when the gyroscope is already generating data for another function or application. A gyroscope-based analysis for swing determination can be executed in one or more of the following ways.

One example method is to calculate angular motion of the mobile device and determine whether the angular motion, or change in angle, exceeds a threshold value. Data from a gyroscope can provide an angular rate. By integrating this angular rate over a window of time (e.g., a 1-step interval, a 2-step interval, etc.), a change in angle can be determined. That is, the integration changes measurements from degrees per second to degrees. Once this change in angle (number of degrees) is determined, it can be compared with a threshold to determine whether the mobile device is in a swing state, because the device undergoes a larger change in angle when in a swing state than under walking or other circumstances. Because the mobile device may be in any orientation while swinging, data from all 3 axes of a gyroscope and determine whether the resulting change in angle from any of the 3 axes exceeds a threshold value. The threshold value may depend on the length of the window of time in which gyroscope data is integrated. Additionally or alternatively, different axes may have different threshold values. According to some embodiments, a device can be determined to be in a swing state if the change in angle exceeds 50 degrees. This angle can vary depending on specific implementation. In some embodiments, all 3 axes may be used in combination to avoid false detects in the swing detection. For example, the z axis integrated angle could exceed 50 degrees but a different threshold, such as a minimum of 30 degrees, may still be checked for the x and y axes.

Another example method can include using accelerometer vertical and horizontal components (for example, by determining gravitational-based acceleration) by using gyroscope data. The individual components can be compared against thresholds to determine whether the device is in a swing state, which can be highly accurate compared with other techniques. According to some embodiments, a device can be determined to be in a swing state if horizontal component exceeds 5 m/s2 and/or vertical component differs from gravity by more than +/−3 m/s2. Because horizontal and vertical components are separated, this method can also be used for step detection, which can analyze the horizontal component to determine a step count.

A variation of these gyroscope-based analyses—and other swing detection analyses detailed herein—can involve providing a probability or other variable output rather than a binary output that indicates that a mobile device is either swinging or not swinging. The variable output can be, for example, a probability that increases as the detection angular motion of the mobile device increases. Such embodiments may not use any threshold values. In some embodiments, the type of output—binary or variable—can vary, depending on the API, application, and/or other factors.

Figure 14:
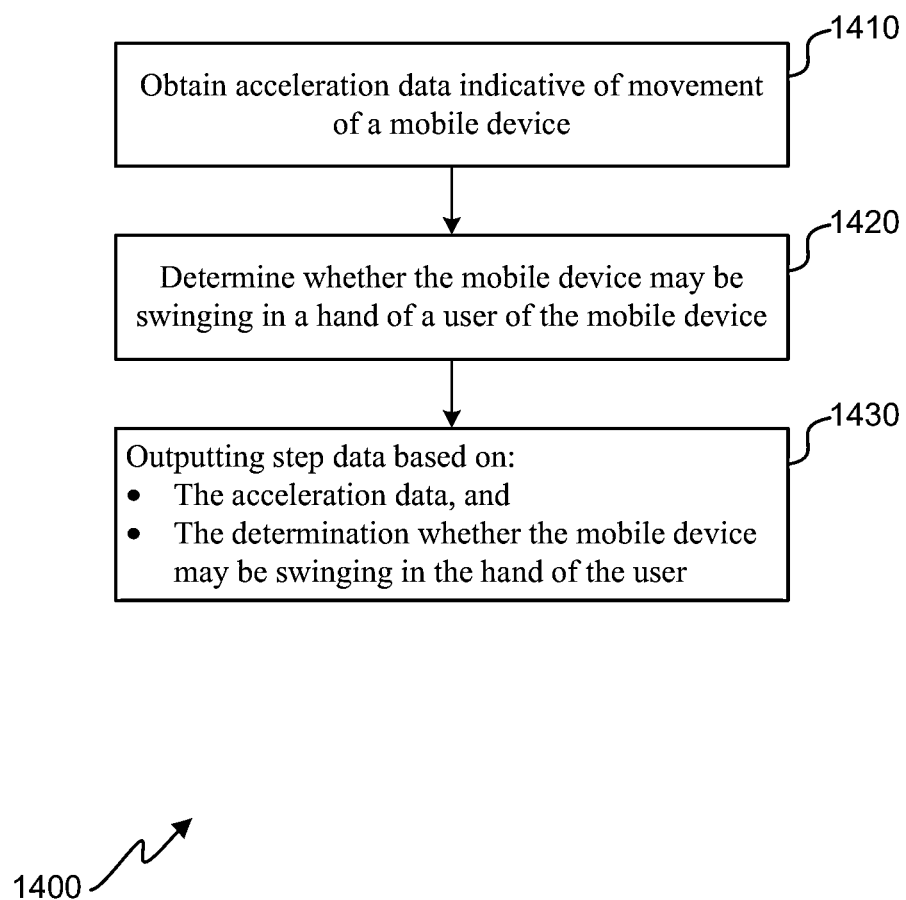
FIG. 14 is a flow diagram of a method of swing compensation in step detection, according to one embodiment.

Once it is determined whether a mobile device is undergoing a swing state using, for example, any of the swing detection techniques previously described, an adjustment of the step data can be made accordingly. FIG. 14 is a flow diagram of a method 1400 of swing compensation in step detection, according to one embodiment. In some embodiments, means for performing the method 1400 can include a mobile device, such as the mobile device 105 of FIG. 2, which may incorporate one or more components shown in FIG. 3. Moreover hardware and/or software means of the mobile device are described in further detail in relation to FIG. 15. Additionally or alternatively, one or more devices communicatively coupled with a mobile device may perform some or all of the functions of method 1400. Components of the method 1400, although illustrated in a particular order, may be performed in a different order and/or simultaneously, according to different embodiments. Moreover, a person of ordinary skill in the art will recognize many additions, omissions, and/or other variations.

At block 1410, acceleration data indicative of movement of a mobile device is obtained. The acceleration data can be provided by one or more accelerometers embedded in and/or communicatively coupled with the mobile device. Depending on desired functionality, the acceleration data can be indicative of acceleration of the mobile device over a window of time, or may be provided in real-time or near real-time, as the acceleration data is being generated. Means for providing the functionality at block 1410 can include, for example, sensor(s) 1540, input device(s) 1570, wireless communication interface 1530, and/or other components of a mobile device 105 as described below in relation to FIG. 15.

At block 1420, it is determined whether the mobile device may be swinging in a hand of a user of the mobile device. Swing detection can be executed in any of a variety of ways, including one or more of the methods previously described, which may process the acceleration data and/or compare data against one or more thresholds. As indicated above, swing detection may additionally or alternatively utilize information from a gyroscope. Further, depending on desired functionality, the determination of whether the mobile device may be swinging in a hand of the user can be binary (e.g., yes or no) or may be variable (e.g., a probability or other confidence metric that the device is swinging in the hand of a user). Means for providing the functionality at block 1420 can include, for example, processing unit(s) 1510, memory 1560, and/or other components of a mobile device 105 as described below in relation to FIG. 15.

At block 1430, step data is outputted based on the acceleration data and the determination whether the mobile device may be swinging in the hand of a user. The step data may be outputted via, for example, and API to an application executed by the mobile device. Additionally or alternatively, the step data may be sent to a separate device. As indicated previously, step data may include a step count and/or a probability associated with the step count, a swing probability, a number of "missteps" (i.e., undetected steps) due to swinging and/or a probability (or other confidence metric) associated with one or more of the missteps, and the like, depending on desired functionality. Means for providing the functionality at block 1430 can include, for example, processing unit(s) 1510, memory 1560, output device(s) 1515, wireless communication interface 1530, and/or other components of a mobile device 105 as described below in relation to FIG. 15.

Figure 15:
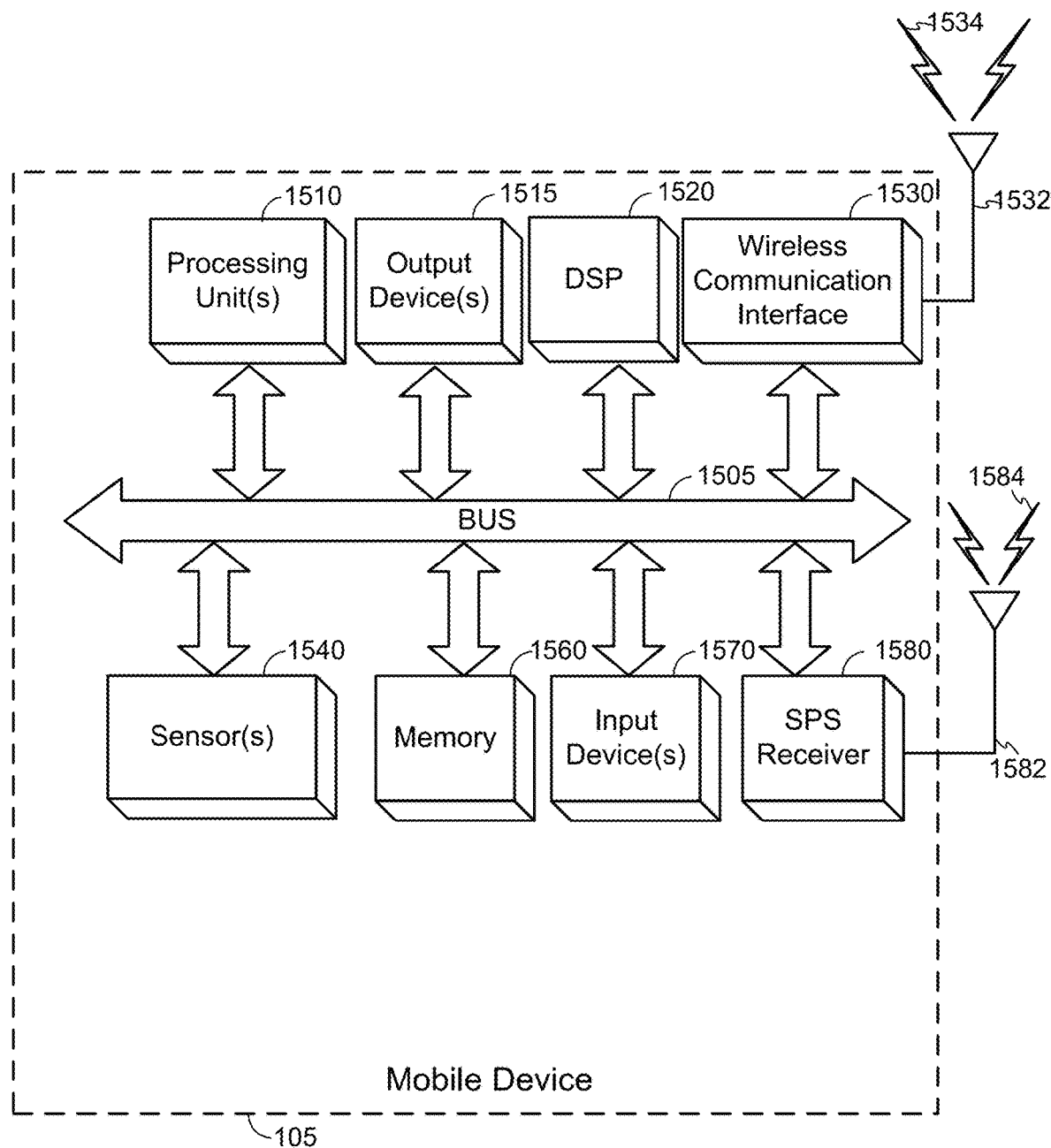
FIG. 15 illustrates an embodiment of a mobile device.

FIG. 15 illustrates an embodiment of a mobile device 105, which can implement the image capture, processing, and/or display techniques discussed herein, such as the methods shown in FIGS. 5, 7, 11, 12, and 14. Furthermore, modules of FIGS. 3 and 10 can be implemented using hardware and/or software components of the mobile device 105 shown in FIG. 15. It should be noted that FIG. 15 is meant only to provide a generalized illustration of various components, any or all of which may be utilized as appropriate. Moreover, system elements may be implemented in a relatively separated or relatively more integrated manner. Additionally or alternatively, some or all of the components shown in FIG. 15 can be utilized in another computing device communicatively coupled with the mobile device 105.

The mobile device 105 is shown comprising hardware elements that can be electrically coupled via a bus 1505 (or may otherwise be in communication, as appropriate). The hardware elements may include a processing unit(s) 1510 which can include without limitation one or more general-purpose processors, one or more special-purpose processors (such as digital signal processors (DSPs), graphics acceleration processors, application specific integrated circuits (ASICs), and/or the like), and/or other processing structure or means, which can be configured to perform one or more of the methods described herein, including methods illustrated in FIGS. 5, 7, 11, 12, and 14. As shown in FIG. 15, some embodiments may have a separate DSP 1520, depending on desired functionality. The mobile device 105 also can include one or more input devices 1570, which can include without limitation one or more camera(s), a touch screen, a touch pad, microphone, button(s), dial(s), switch(es), and/or the like; and one or more output devices 1515, which can include without limitation a display, light emitting diode (LED), speakers, and/or the like.

The mobile device 105 might also include a wireless communication interface 1530, which can include without limitation a modem, a network card, an infrared communication device, a wireless communication device, and/or a chipset (such as a Bluetooth™ device, an IEEE 1502.11 device, an IEEE 1502.15.4 device, a WiFi device, a WiMax device, cellular communication facilities, etc.), and/or the like. The wireless communication interface 1530 may permit data to be exchanged with a network, wireless access points, other computer systems, and/or any other electronic devices described herein. The communication can be carried out via one or more wireless communication antenna(s) 1532 that send and/or receive wireless signals 1534.

Depending on desired functionality, the wireless communication interface 1530 can include separate transceivers to communicate with base transceiver stations (e.g., base transceiver stations of a cellular network) and access points. These different data networks can include, an OFDMA and/or other type of network.

The mobile device 105 can further include sensor(s) 1540. Such sensors can include, without limitation, one or more accelerometer(s), gyroscope(s), camera(s), magnetometer(s), altimeter(s), microphone(s), proximity sensor(s), light sensor(s), and the like. At least a subset of the sensor(s) 1540 can provide motion detection for swing and/or step detection as discussed herein, and may comprise the sensing unit 310 of FIG. 3.

Embodiments of the mobile device may also include a Satellite Positioning System (SPS) receiver 1580 capable of receiving signals 1584 from one or more SPS satellites using an SPS antenna 1582. Such positioning can be utilized to complement and/or incorporate the techniques described herein. It can be noted that, as used herein, an SPS may include any combination of one or more global and/or regional navigation satellite systems and/or augmentation systems, and SPS signals may include SPS, SPS-like, and/or other signals associated with such one or more SPS.

The mobile device 105 may further include and/or be in communication with a memory 1560. The memory 1560 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data structures, such as the FIFO and/or other memory utilized by the techniques described herein, and may be allocated by hardware and/or software elements of an OFDM receiver. Additionally or alternatively, data structures described herein can be implemented by a cache or other local memory of a DSP 1520 or processing unit(s) 1510. Memory can further be used to store an image stack, motion sensor data, and/or other information described herein.

The memory 1560 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above, such as the methods illustrated in FIGS. 5, 7, 11, 12, and/or 14, might be implemented as code and/or instructions executable by the mobile device 105 (and/or processing unit(s) 1510 within a mobile device 105) and/or stored on a non-transitory and/or machine-readable storage medium (e.g., a "computer-readable storage medium," a "machine-readable storage medium," etc.), such as memory 1560. In an aspect, then, such code and/or instructions can be used to configure and/or adapt a general purpose processor (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of swing compensation in step detection, the method comprising:
    obtaining acceleration data indicative of movement of a mobile device;
    determining whether the mobile device may be swinging in a hand of a user of the mobile device, wherein the determining whether the mobile device may be swinging in a hand of a user of the mobile device comprises determining, with a processing unit, that twice a frequency determined from the acceleration data falls within a predetermined range of known step rates; and
    outputting step data based on:
        the acceleration data, and
        the determination whether the mobile device may be swinging in the hand of the user;
    wherein outputting the step data comprises:
        providing the step data to an application executed by the mobile device, or
        causing the mobile device to send the step data to a separate device, or
        any combination thereof.

2. The method of claim 1, wherein determining whether the mobile device may be swinging in the hand of the user further comprises determining whether the acceleration data exceeds a threshold value.

3. The method of claim 2, wherein the threshold value is between 10 and 12 m/s$^2$.

4. The method of claim 1, wherein determining whether the mobile device may be swinging in the hand of the user further comprises calculating eigenvalues of the acceleration data.

5. The method of claim 4, further comprising determining whether at least one eigenvalue exceeds a threshold value.

6. The method of claim 4, further comprising determining whether a ratio of the eigenvalues exceeds a threshold value.

7. The method of claim 1, wherein determining whether the mobile device may be swinging in the hand of the user further comprises conducting a frequency analysis of the acceleration data.

8. The method of claim 7, wherein the frequency analysis comprises autocorrelation.

9. The method of claim 7, wherein the frequency analysis comprises combining the acceleration data with a nominal step rate.

10. The method of claim 1, further including determining a probability related to the determination of whether the user made a step.

11. The method of claim 1, wherein determining whether the mobile device may be swinging in the hand of the user further comprises:
    estimating a direction of gravity;
    determining an angle of the mobile device in relation to the direction of gravity; and
    determining whether the angle exceeds a threshold value.

12. The method of claim 1, wherein determining whether the mobile device may be swinging in the hand is based, at least in part, on data from a gyroscope.

13. The method of claim 1, wherein outputting step data comprises outputting a number of detected steps.

14. The method of claim 13, wherein the number of detected steps is altered from an original number, based on the determination whether the mobile device may be swinging in the hand of the user.

15. The method of claim 13, wherein outputting step data further comprises outputting a number of undetected steps.

16. The method of claim 13, wherein outputting step data further comprises outputting a probability associated with the number of detected steps.

17. An apparatus comprising:
    a memory; and
    a processing unit coupled to the memory and configured to perform functions including:
        obtaining acceleration data indicative of movement of a mobile device;
        determining whether the mobile device may be swinging in a hand of a user of the mobile device, wherein the determining whether the mobile device may be swinging in a hand of a user of the mobile device comprises determining that twice a frequency determined from the acceleration data falls within a predetermined range of known step rates; and
        outputting step data based on:
            the acceleration data, and
            the determination whether the mobile device may be swinging in the hand of the user;
        wherein outputting the step data comprises:
            providing the step data to an application executed by the mobile device, or
            causing the mobile device to send the step data to a separate device, or
            any combination thereof.

18. The apparatus of claim 17, further comprising an accelerometer communicatively coupled with the processing unit and configured to provide the acceleration data.

19. The apparatus of claim 17, wherein the processing unit is further configured to determine a probability related to the determination of whether the user made a step.

20. The apparatus of claim 17, wherein the processing unit is further configured to determine whether the mobile device may be swinging in the hand of the user by:
    estimating a direction of gravity;
    determining an angle of the mobile device in relation to the direction of gravity; and
    determining whether the angle exceeds a threshold value.

21. The apparatus of claim 17, wherein the processing unit is configured to determine whether the mobile device may be swinging in the hand is based, at least in part, on data from a gyroscope.

22. The apparatus of claim 17, wherein the processing unit is configured to output step data by outputting a number of detected steps.

23. The apparatus of claim 22, wherein the processing unit is configured to alter the number of detected steps from an original number, based on the determination whether the mobile device may be swinging in the hand of the user.

24. The apparatus of claim 22, wherein the processing unit is further configured to output a number of undetected steps.

25. The apparatus of claim 22, wherein the processing unit is further configured to output a probability associated with the number of detected steps.

26. A device comprising:
means for obtaining acceleration data indicative of movement of a mobile device;
means for determining whether the mobile device may be swinging in a hand of a user of the mobile device, wherein the means for determining whether the mobile device may be swinging in a hand of a user of the mobile device comprises means for determining that twice a frequency determined from the acceleration data falls within a predetermined range of known step rates; and
means for outputting step data based on:
the acceleration data, and
the determination whether the mobile device may be swinging in the hand of the user;
wherein the means for outputting the step data comprises:
means for providing the step data to an application executed by the mobile device, or
means for causing the mobile device to send the step data to a separate device, or
any combination thereof.

27. The device of claim 26, wherein the means for determining whether the mobile device may be swinging in the hand of the user further comprise means for calculating eigenvalues of the acceleration data.

28. The device of claim 27, further comprising means for determining whether at least one eigenvalue exceeds a threshold value.

29. The device of claim 27, further comprising means for determining whether a ratio of the eigenvalues exceeds a threshold value.

30. The device of claim 26, wherein the means for determining whether the mobile device may be swinging in the hand of the user comprise means for conducting a frequency analysis of the acceleration data.

31. The device of claim 30, wherein the frequency analysis comprises autocorrelation.

32. The device of claim 30, wherein the means for conducting the frequency analysis comprise means for combining the acceleration data with a nominal step rate.

33. A non-transitory computer-readable storage medium having instructions embedded thereon for causing one or more computing devices to perform swing compensation in step detection, the instructions comprising computer code for:
obtaining acceleration data indicative of movement of a mobile device;
determining whether the mobile device may be swinging in a hand of a user of the mobile device, wherein the computer code for determining whether the mobile device may be swinging in a hand of a user of the mobile device comprises computer code for determining that twice a frequency determined from the acceleration data falls within a predetermined range of known step rates; and
outputting step data based on:
the acceleration data, and
the determination whether the mobile device may be swinging in the hand of the user;
wherein outputting the step data comprises:
providing the step data to an application executed by the mobile device, or
causing the mobile device to send the step data to a separate device, or
any combination thereof.

34. The non-transitory computer-readable storage medium of claim 33, wherein the code for determining whether the mobile device may be swinging in the hand of the user further includes code for determining whether the acceleration data exceeds a threshold value.

35. The non-transitory computer-readable storage medium of claim 33, wherein the code for determining whether the mobile device may be swinging in the hand of the user further includes code for calculating eigenvalues of the acceleration data.

36. The non-transitory computer-readable storage medium of claim 33, wherein the code for determining whether the mobile device may be swinging in the hand of the user includes code for conducting a frequency analysis of the acceleration data.

37. The non-transitory computer-readable storage medium of claim 33, wherein the code for determining whether the mobile device may be swinging in the hand of the user further includes code for:
estimating a direction of gravity;
determining an angle of the mobile device in relation to the direction of gravity; and
determining whether the angle exceeds a threshold value.

38. The non-transitory computer-readable storage medium of claim 33, wherein the code for outputting step data includes code for outputting a number of detected steps.

* * * * *